(12) United States Patent
Nakai

(10) Patent No.: US 6,507,437 B1
(45) Date of Patent: *Jan. 14, 2003

(54) DIFFRACTIVE OPTICAL ELEMENT AND PHOTOGRAPHIC OPTICAL SYSTEM HAVING THE SAME

(75) Inventor: Takehiko Nakai, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/468,864

(22) Filed: Dec. 21, 1999

(30) Foreign Application Priority Data

Dec. 24, 1998 (JP) .......................... 10-376552
Dec. 3, 1999 (JP) .......................... 11-344369

(51) Int. Cl.⁷ .......................... G02B 5/18; G02B 27/44
(52) U.S. Cl. .......................... 359/576; 359/569; 359/566
(58) Field of Search .......................... 359/568, 566, 359/569, 575, 576

(56) References Cited

U.S. PATENT DOCUMENTS

| | | | |
|---|---|---|---|
| 5,044,706 A | 9/1991 | Chen | 359/357 |
| 5,737,113 A | 4/1998 | Kuramochi et al. | 359/259 |
| 5,790,321 A | 8/1998 | Goto | 359/742 |
| 5,847,877 A | 12/1998 | Imamura et al. | |
| 5,930,043 A | * 7/1999 | Ogawa | 359/566 |
| 6,011,651 A | 1/2000 | Kamo | 359/575 |
| 6,157,488 A | 12/2000 | Ishii | |

FOREIGN PATENT DOCUMENTS

| | | |
|---|---|---|
| JP | 4-213421 | 8/1992 |
| JP | 6-324262 | 11/1994 |
| JP | 9-127322 | 5/1997 |
| JP | 10-104411 | 4/1998 |
| JP | 10-133149 | 5/1998 |

OTHER PUBLICATIONS

Michael W. Farn, et al., "Diffractive Doublet Corrected On–Axis at Two Wavelengths," SPIE vol. 1354, International Lens Design Conference (1990), pp. 24–37.

A.D. Kathman, et al., "Binary Optics in Lens Design," SPIE vol. 1354, International Lens Design Conference (1990), pp. 297–309.

A.P. Wood, "Using Hybrid Refractive–Diffractive Elements in Infrared Petzval Objectves," SPIE vol. 1354, International Lens Design Conference (1990), pp. 316–322.

* cited by examiner

Primary Examiner—Audrey Chang
(74) Attorney, Agent, or Firm—Fitzpatrick, Cella, Harper & Scinto

(57) ABSTRACT

To obtain a diffractive optical element of high diffraction efficiency over a wide range of wavelengths with no conspicuous color flare and a photographic optical system having the diffractive optical element, at least two diffraction gratings of different materials in dispersion are stratified, the first order is chosen as the design order and two wavelengths which, when multiplied one times, amounts to the maximum optical path length difference in the grating structure are used as the design wavelengths, wherein each of the values of the plurality of design wavelengths is determined so as to make white or nearly white flare caused by the diffracted light in the zero and second orders.

10 Claims, 11 Drawing Sheets

FIG. 11

| | GRATING THICKNESS d1 | GRATING THICKNESS d2 | DESIGN WAVELENGTH λ01 | DESIGN WAVELENGTH λ0L | DESIGN WAVELENGTH INTERVAL Δλ0.a | AMOUNT OF FLARE IN FIRST LIGHT RECEIVING MEANS E1(λ0) | AMOUNT OF FLARE IN SECOND LIGHT RECEIVING MEANS E2(λ0) | AMOUNT OF FLARE IN THIRD LIGHT RECEIVING MEANS E3(λ0) |
|---|---|---|---|---|---|---|---|---|
| ① | 9.5 μm | 6.9 μm | 438nm | 588nm | 150nm | 0.81% | 0.29% | 0.70% |
| ② | 11.0 | 8.12 | 455 | 605 | 150 | 1.94 | 0.44 | 0.32 |
| ③ | 6.0 | 5.70 | 431 | 550 | 119 | 0.36 | 0.08 | 1.94 |
| ④ | 10.5 | 7.67 | 425 | 645 | 220 | 1.43 | 1.97 | 0.16 |

DIFFRACTIVE OPTICAL ELEMENT AND PHOTOGRAPHIC OPTICAL SYSTEM HAVING THE SAME

BACKGROUND OF THE INVENTION

1. Field of the Invention

The present invention relates to a diffractive optical element to be used either at a plurality of wavelengths, or with light in a predetermined band, and a, photographic optical system having the diffractive optical element and, more particularly, to a diffractive optical element suited to be used as a part of a photographic optical system using three or more light beams of different original colors in forming a color image.

2. Description of Related Art

Conventionally, as one of the methods for correcting chromatic aberrations of an optical system, there is known a method of combining two glass materials (lenses) which differ in dispersion from each other.

Unlike this method o: reducing the chromatic aberrations by selectively using two glass materials, it has been known to provide the optical system with a diffractive optical element (hereinafter also called the "diffraction grating") as made up in either one of the lens surfaces thereof or somewhere else. Such a method of reducing the chromatic aberrations is disclosed in, for example, "International Lens Design Conference" in SPIE Vol. 1354 (1990), Japanese Laid-Open Patent Applications No. Hei 4-21342and No. Hei 6-324262 and U.S. Pat. No. 5,044,706. This method is attained by utilizing such a physical phenomenon that, for a refractive surface and a diffractive surface in an optical system, if their refractive powers are of the same sign, chromatic aberrations for the rays of light of a certain reference wavelength occur in the opposite directions. Further, with such a diffractive optical element, when its periodical structure is changed in pitch as it can be done freely, an effect similar to an aspherical lens is produced. Therefore, the diffractive optical element has an additional great advantage of reducing even mono-chromatic aberrations.

Here, it is in refraction that one ray, even after having refracted, remains one ray. In diffraction, on the other hand, one ray brakes up to a plurality of rays in different orders of diffraction. Therefore, for a case of using the diffractive optical element in an optical system, there is a need to make determination of the grating structure so that a light beam of the useful wavelength region concentrates on a particular order (hereinafter also referred to as the "design order"). In a situation when light concentrates on the particular order, the intensities of the diffracted rays in the other orders become low. If the intensity is "0", the corresponding diffracted ray becomes non-existent.

In order to make useful the above-described advantage of the diffractive optical element, it becomes necessary throughout the entire range of predetermined wavelengths including design wavelenghts that the diffraction efficiency for the rays in the design order is sufficiently high. It should also be pointed out that the rays having other orders than the design order focus themselves at different places than the rays of the design order do, becoming flare (light). In an optical system employing the diffractive optical element, therefore, it is of great importance to consider the spectral distribution, too, of diffraction efficiencies of the rays in the design order fully and, further, the behavior of even more rays which are in the orders other than the design order (or the useless diffracted rays).

FIG. 19 shows a diffractive optical element 1 in which a diffraction grating 3 is made up in one layer on a substrate 2. With such a diffractive optical element 1 formed on a surface of an optical system, the rays in particular orders diffract with diffraction efficiencies shown in FIG. 20. The values of the diffraction efficiency are in percentage of the diffracted amount of light at every wavelength to the transmitted amount of light. The reflected light from the grating boundary or the like is not taken into account in the evaluation, because the explanation becomes complicated. In FIG. 20, the abscissa represents the wavelength and the ordinate represents the diffraction efficiency. This diffractive optical element 1 is so designed that the diffraction efficiency in the first order (a solid line curve in FIG. 20) is highest in the predetermined wavelength region. That is, the design order is the first one. Furthermore, the diffraction efficiencies in the orders near to the first one (or $(1\pm1)$st orders, namely, zero order and second order) are also depicted for comparison. As shown in FIG. 20, it is in the design order that the diffraction efficiency has the highest value at a certain wavelength (hereinafter referred to as the "design wavelength") and becomes gradually lower toward the ends of the whole spectrum. This decrease of the diffraction efficiency in the design order is translated into an increase of the amount of diffracted rays in the other orders, becoming flare. In addition, in a case where two or more diffraction gratings are used, in particular, the lowering of the diffraction efficiency at the other wavelengths than the design wavelength leads to reduction of the transmittance.

To diminish the lowering of the diffraction efficiency, many previous proposals have been made.

For example, Japanese Laid-Open patent Application No. Hei 9-127322 discloses a diffractive optical element made up in such a way that, as shown in FIG. 21, three different materials of different kinds (for three layers 4, 8 and 5 of diffraction gratings) and two different grating thicknesses d1 and d2 (for the bottom and top gratings 4 and 5) are appropriately selected and that the bottom and top diffraction gratings of an equal pitch distribution are juxtaposed. By this construction and arrangement, a high diffraction efficiency in the design order is realized over the entire visible region, as shown in FIG. 23.

Also, a diffractive optical element capable (if diminishing the lowering of the diffraction efficiency has been proposed in Japanese Laid-Open Patent Application No. Hei 10-133149. As shown in FIG. 22, this diffractive optical element has two layers superimposed one upon another. For the stratification of the layers 4 and 5 in cross-section, the refractive indices and dispersions of their materials and the thicknesses of the gratings in them are made optimum, thus realizing a high diffraction efficiency in the design order over the entire range of visible spectrum.

In another Japanese Laid-Open Patent Application No. Hei 10-104411, with the use of a diffractive optical element of the kinoform type shown in FIG. 19, the grating thickness is adjusted to shift the design wavelength as desired, thus reducing the amount of needless diffracted light in the orders near to the design order.

Of the prior known techniques described above, the one proposed in Japanese Laid-Open patent Application No. Hei 9-127322 has greatly improved the diffraction efficiency in the design order. Therefore, the proportion of the diffracted rays in the orders other than the design order, or the needless diffracted rays, too, is improved. So, the diffractive optical element produces less flare. However, color flare is appreciable in the obtained image. Also, there is no detailed description about the color appearance of flare and the amount of flare.

Meanwhile, Japanese Laid-Open Patent Application No. Hei 10-104411 is concerned with the grating having one diffractive surface like that shown in FIG. 19 (hereinafter called the "mono-layer DOE" for Diffractive Optical Element). With this regard, it suggests the influence of the color flare due to the light in the needless orders. However, as far as the diffractive optical element in the stratified form of two or more layers (hereinafter called the "stratified multilayer DOE") is concerned, nothing is said about the flare.

Using the stratified multilayer DOE described above, the optical system has succeeded in greatly reducing the flare from that when the mono-layer DOE is in use. However, this does not mean that the useless diffracted light is not present at all. So, it is, though little, left to exist. In application to a type of optical system which does not suffer changes of the photo-taking (light-projecting) condition (for example, the reader lens in the copying machine and the projection lens in the liquid crystal projector), the influence of flare is depressed to a negligible level by the stratified multilayer DOE. However, after having conducted many investigations, the inventor of the present invention has found that, for the film camera or video camera, as various photographic conditions are encountered, it sometimes happens that the little remaining of flare gives a serious problem. To show an example, in a case where a light source exists in the scene to be photographed, a correct exposure is usually made not on the light source, but on an object of photographic interest other than the light source. Accordingly, the light source is shot in an over-exposure. For example, assuming that the exposure to the light source is 100 times greater than the correct exposure, then even if the flare is left as little as 2%, because the flare of the light source, too, is 100 times intensified, the flare gets a light amount 2 times as large as the correct exposure. Therefore, it is sure that the flare appears in the picture which will be taken.

As described above, in application of the stratified multilayer DOE to the optical system in the film camera or video camera, the flare becomes problematic with some possibility, no matter however little it may be. In particular, if the flare component has a wavelength dependency, color flare is produced even in the case of the stratified multilayer DOE, being similar to the color light characteristics based on the mono-layer DOE in Japanese Laid-Open Patent Application No. Hei 10-104411.

BRIEF SUMMARY OF THE INVENTION

An object of the present invention is to provide a diffractive optical element having no prominent color flare due to the diffracted rays in the needless orders, and a photographic optical system having the diffractive optical element.

To attain the above object, in accordance with a first aspect of the invention, there is provided a photographic optical system comprising a diffractive optical element having a grating structure in which a plurality of diffraction gratings made from at least two kinds of materials different in dispersion from each other are laminated, and having a plurality of design wavelengths, a maximum optical path length difference in the grating structure being integer times each of the plurality of design wavelengths, the diffractive optical element satisfying the following conditions for each of the design wavelengths λ0:

$$0 < E1(\lambda 0) + E2(\lambda 0) + E3(\lambda 0) < 0.04 \quad (1)$$

$$0 < \max\{E1(\lambda 0), E2(\lambda 0), E3(\lambda 0)\} - \min\{E1(\lambda 0), E2(\lambda 0), E3(\lambda 0)\} < 0.02 \quad (2)$$

where max$\{E1(\lambda 0), E2(\lambda 0), E3(\lambda 0)\}$ represents a maximum value among $E1(\lambda 0)$, $E2(\lambda 0)$ and $E3(\lambda 0)$, and min$\{E1(\lambda 0), E2(\lambda 0), E3(\lambda 0)\}$ represents a minimum value among $E1(\lambda 0)$, $E2(\lambda 0)$ and $E3(\lambda 0)$, where $$E1(\lambda 0) = \frac{\int D_{m-1}(\lambda 0, \lambda) L(\lambda) F1(\lambda) T(\lambda) d\lambda + \int D_{m+1}(\lambda 0, \lambda) L(\lambda) F1(\lambda) T(\lambda) d\lambda}{\int D_m(\lambda 0, \lambda) L(\lambda) F1(\lambda) T(\lambda) d\lambda}$$

$$E2(\lambda 0) = \frac{\int D_{m-1}(\lambda 0, \lambda) L(\lambda) F2(\lambda) T(\lambda) d\lambda + \int D_{m+1}(\lambda 0, \lambda) L(\lambda) F2(\lambda) T(\lambda) d\lambda}{\int D_m(\lambda 0, \lambda) L(\lambda) F2(\lambda) T(\lambda) d\lambda}$$

$$E3(\lambda 0) = \frac{\int D_{m-1}(\lambda 0, \lambda) L(\lambda) F3(\lambda) T(\lambda) d\lambda + \int D_{m+1}(\lambda 0, \lambda) L(\lambda) F3(\lambda) T(\lambda) d\lambda}{\int D_m(\lambda 0, \lambda) L(\lambda) F3(\lambda) T(\lambda) d\lambda}$$

where $$\int D_m(\lambda 0, \lambda) L(\lambda) F1(\lambda) T(\lambda) d\lambda = \int D_m(\lambda 0, \lambda) L(\lambda) F2(\lambda) T(\lambda) d\lambda = \int D_m(\lambda 0, \lambda) L(\lambda) F3(\lambda) T(\lambda) d\lambda$$

where $D_{m-1}(\lambda 0, \lambda)$, $D_m(\lambda 0, \lambda)$ and $D_{m+1}(\lambda 0, \lambda)$: diffraction efficiencies for a wavelength λ in the (m−1)st, m-th and (m+1)st orders, respectively, in the diffractive optical element where the m-th order is taken as a design order and the wavelength λ0 is taken as the design wavelength, $L(\lambda)$: a spectral characteristic for the wavelength λ of a light source, $F1(\lambda)$, $F2(\lambda)$, $F3(\lambda)$: spectral sensitivity characteristics of light receiving means for detecting light in respective wavelength regions in an image pickup means, where $F1(\lambda)$, $F2(\lambda)$ and $F3(\lambda)$ are arranged in order from the shorter of wavelengths at which spectral sensitivities become maximum, and $T(\lambda)$: a transmittance for the wavelength λ of the photographic optical system.

Another feature in the first aspect of the invention is that the shortest design wavelength λ01 among the plurality of design wavelengths of the diffractive optical element satisfies the following condition:

400 nm ≤ λ01 ≤ 455 nm.

Another feature in the first aspect of the invention is that the longest design wavelength λ0L among the plurality of design wavelengths of the diffractive optical element satisfies the following condition:

550 nm ≤ λL ≤ 620 nm.

Another feature in the first aspect of the invention is that an interval Δλ0.a between adjacent two of the plurality of design wavelengths of the diffractive optical element satisfies the following condition:

Δλ0.a ≤ 220 nm where Δλ0.a=0.a+1−λ0.a $$1 \leq a \leq L-1$$

where L is the number of the plurality of design wavelengths.

Another feature in the first aspect of the invnetion is that at least one of the plurality of diffraction gratings differs in orientation of grating from the other diffraction gratings.

Another feature in the first aspect of the invention is that a useful wavelength region of the diffractive optical element is a visible spectrum.

Another feature in the first aspect of the invention is that the plurality of diffraction gratings are layered on a substrate and, when the plurality of diffraction gratings are consecutively numbered, from the diffraction grating nearest to the substrate, as the first diffraction grating, the second diffraction grating and up to the i-th diffraction grating, a material from which the first diffraction grating is made is the same as a material of the substrate.

Another feature in the first aspect of the invention is that the plurality of diffraction gratings are arranged in intimate contact or in closely spaced relation.

In accordance with a second aspect of the invention, there is provided a diffractive optical element having a grating structure in which a plurality of diffraction gratings made from at least two kinds of materials different in dispersion from each other are laminated, and having a plurality of design wavelengths, a maximum optical path length difference in the grating structure being integer times each of the plurality of design wavelengths, flare caused by diffracted rays in orders other than the plurality of design wavelengths being made white or a color near to white.

Another feature in the second aspect of the invention is that the shortest design wavelength λ01 among the plurality of design wavelengths of the diffractive optical element satisfies the following condition:

$$400 \text{ nm} \leq \lambda 01 \leq 455 \text{ nm}.$$

Another feature in the second aspect of the invention is that the longest design wavelength λ0L among the plurality of design wavelengths of the diffractive optical element satisfies the following condition:

$$550 \text{ nm} \leq \lambda 0L \leq 620 \text{ nm}.$$

Another feature in the second aspect of the invention is that the plurality of diffraction gratings are arranged in intimate contact or in closely spaced relation.

Another feature in the second aspect of the invention is that a photographic optical system comprises an optical system including the diffractive optical element, and a plurality of light receiving means whose wavelength regions at peak sensitivity are different from each other, and an amount of light of each of diffracted rays in orders other than the plurality of design wavelengths is controlled by the plurality of light receiving means so that the flare becomes white or a color near to white.

The above and further aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 11 is a table showing the relationship between the design wavelength and the amount of flare.

DETAILED DESCRIPTION OF THE INVENTION

Hereinafter, preferred embodiments of the invention will be described in detail with reference to the drawings.

Figure 1:
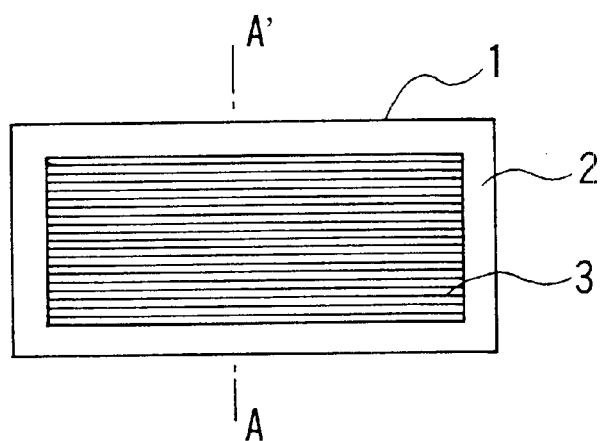
FIG. 1 is a front view of the main parts of a diffractive optical element according to a first embodiment of the invention.
Figure 2:
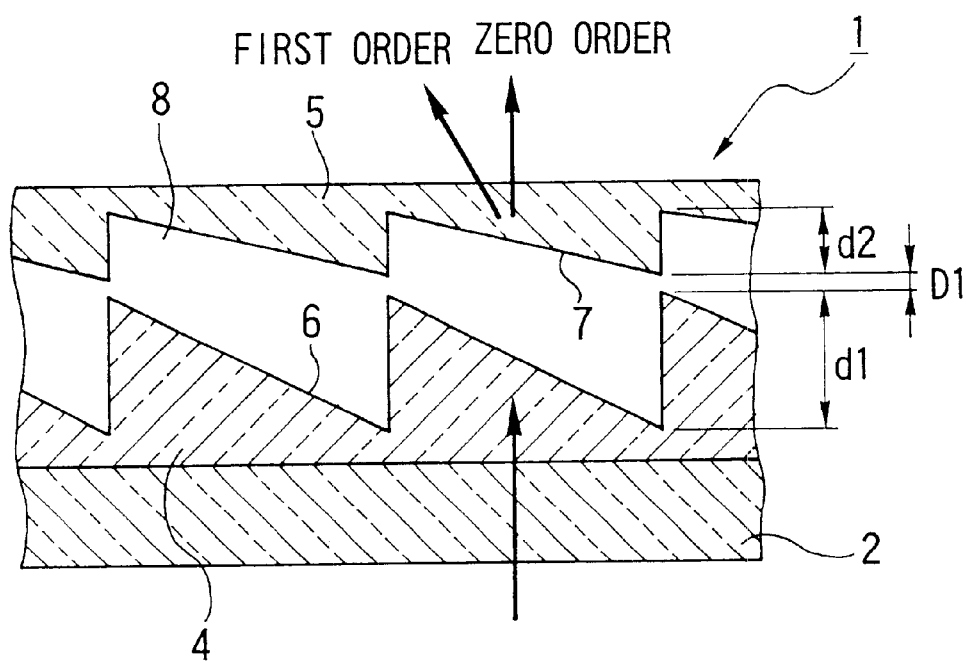
FIG. 2 is a cross-sectional view taken along A–A' line in FIG. 1 to explain the forms of diffraction gratings in the diffractive optical element according to the first embodiment of the invention.

FIG. 1 is a front elevation view showing a diffractive optical element according to a first embodiment of the invention. The diffractive optical element 1 is composed of a substrate 2 and a diffraction grating 3 formed on the surface of the substrate 2. FIG. 2 is a fragment of the cross-section taken along A–A' line of FIG. 1. This illustration of FIG. 2 is considerably deformed in the depth of the grooves of the diffraction grating. In the first embodiment, the diffraction grating is composed of a first layer 4 and a second layer 5 formed on the substrate 2. At a boundary between the first layer 4 and the air 8 there is a first diffraction grating surface 6. At a boundary between the second layer 5 and the air 8 there is a second diffraction grating surface 7. The diffractive optical element 1 has a structure of the first and second diffraction gratings 4 and 5.

Figure 19:
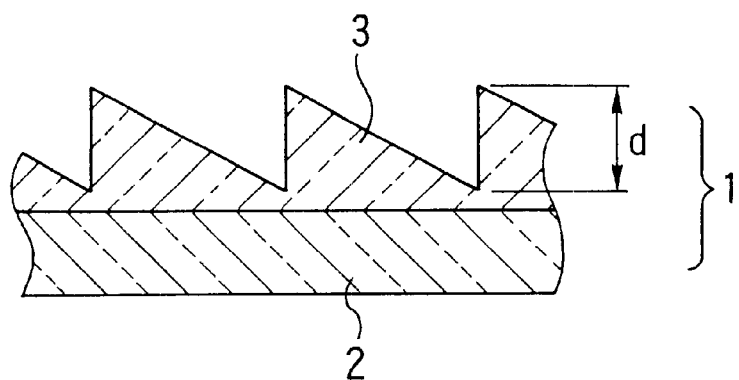
FIG. 19 is a sectional view of a conventional example of the grating form (triangular wave form).
Figure 20:
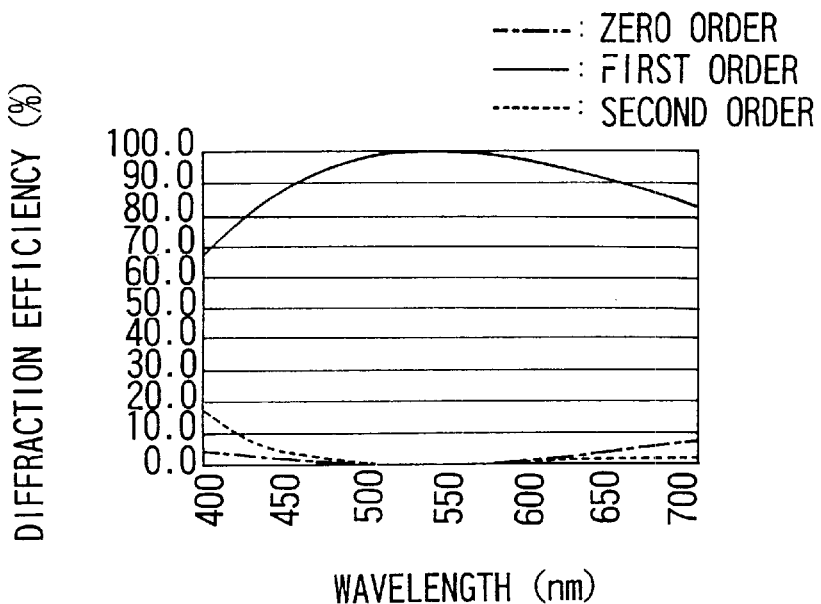
FIG. 20 is a graph for explaining the diffraction efficiency of the conventional example.

Next, the first embodiment is explained about the diffraction efficiency of the diffractive optical element 1. Conventionally, as shown in FIG. 19, the diffraction grating 1 is of transmission type with one layer 3. The diffraction efficiency of the diffractive optical element becomes highest (100%) at the design wavelength $\lambda 0$ under a condition that, as the light beam is normally incident on the substrate 2, the difference in the length of optical path of the optics between the rays passing therethrough to the peak and valley, respectively, of the diffraction grating 3 is equal to integer times as much as the design wavelength. Hence, the following equation is established:

$$(n01-1)d=m\lambda 0 \tag{3}$$

where n01 is the refractive index for the wavelength $\lambda 0$ of the material of the diffraction grating 3, d is the grating thickness, and m is the design order of diffraction (the design order). Also, $\lambda 0$ is the design wavelength.

Since the equation (3) includes the term of wavelengths, the sign of equality is established only at the design wavelength. At the other wavelengths, the diffraction efficiency drops from the maximum value. For an arbitrary wavelength $\lambda$, the diffraction efficiency is expressed by the following equation (4):

$$\eta(\lambda)=\sin c^2[\pi\{M-(n1(\lambda)-1)d/\lambda\}] \tag{4}$$

where M is the diffraction order for which to evaluate the diffraction efficiency, and n1($\lambda$) is the refractive index for the wavelength $\lambda$ of the material of the diffraction grating 3.

Even with the use of two or more layers in the diffractive optical element, the fundamental optical characteristics as the diffraction gratings are identical. In order to integrate all the layers to function as one diffraction grating, therefore, every diffraction grating is first treated with the rays passing respectively through the peak and valley of its grooves to obtain the optical path length difference of the optics. For all the gratings, determination is then made such that the total sum of their differences coincides with integer times the wavelength. In the first embodiment, for the case shown in FIG. 2, the diffraction efficiency in the design order m becomes highest under a condition expressed by the following equation:

$$(n01-1)d1\pm(n02-1)d2=m\lambda \tag{5}$$

where n01 is the refractive index for the design wavelength $\lambda 0$ of the material of the first diffraction grating 4, n02 is the refractive index for the design wavelength $\lambda 0$ of the material of the second diffraction grating 5, d1 and d2 are respectively the thicknesses of the first and second diffraction gratings 4 and 5, and m is the design order. Here, the ray diffracted to the left as viewed from the diffracted rays in the zero order in FIG. 2 is assumed to be positive in diffraction order, and the ray diffracted to the right is assumed to be negative in diffraction order. Then, for each layer, the symbol of ± in the equation (5) should be read for plus when the grating thickness decreases from the left to the right, as in the case of the first diffraction grating 4. Conversely, when the grating thickness increases from the left to the right as in the case of the second diffraction grating 5, the symbol of ± should be read for minus.

In the arrangement shown in FIG. 2, for a wavelength $\lambda$ other than the design wavelength $\lambda 0$, the diffraction efficiency is given by the following expression:

$$\eta(\lambda)=\sin c^2[\pi\{M-\{(n1(\lambda)-1)d1\pm(n2(\lambda)-1)\ d2\}/\lambda\}]=\sin c^{2[\pi\{M-\Phi(\lambda)/\lambda\}]} \tag{6}$$

where $\Phi(\lambda)=(n1(\lambda)-1)d1\pm(n2(\lambda)-1)d2$, and where M is the diffraction order for which to evaluate the diffraction efficiency, n1($\lambda$) is the refractive index for the wavelength $\lambda$ of the material of the first diffraction grating 4, n2($\lambda$) is the refractive index for the wavelength $\lambda$ of the material of the second diffraction grating 5, and d1 and d2 are the thicknesses of the first and second diffraction gratings 4 and 5, respectively.

Figure 21:
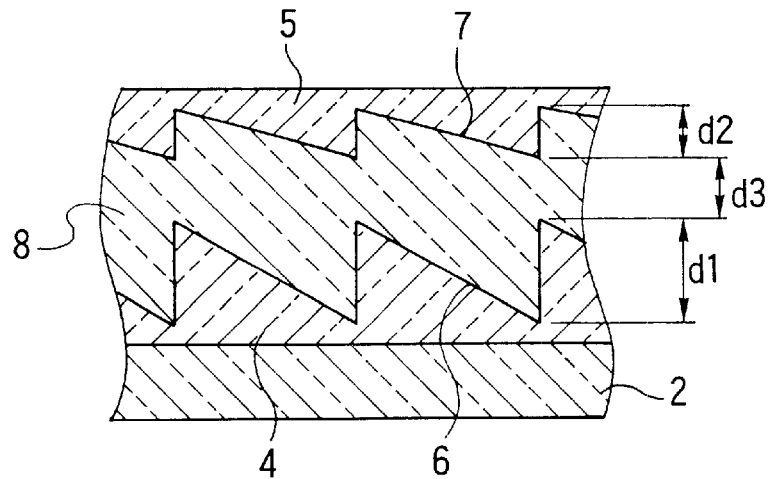
FIG. 21 is a sectional view of a conventional example of a stratified multilayer type diffractive optical element.
Figure 22:
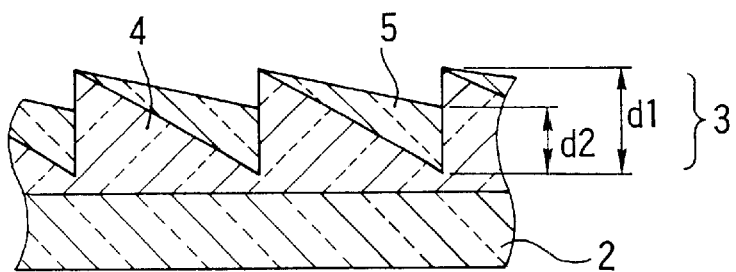
FIG. 22 is a sectional view of another conventional example of the stratified multilayer type diffractive optical element.
Figure 23:
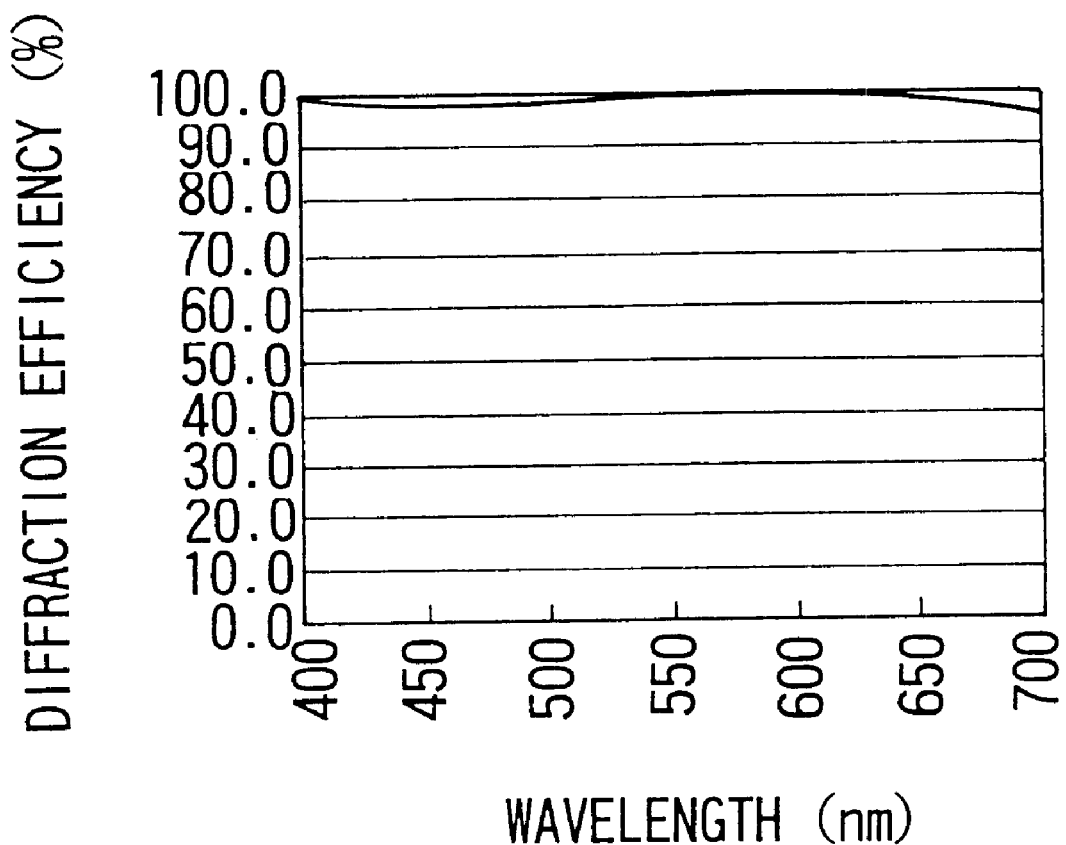
FIG. 23 is a graph for explaining the diffraction efficiency of the conventional example of the stratified multilayer type diffractive optical element.

Although, in FIG. 2, the diffraction grating surfaces 6 and 7 are formed at the boundaries with air, the invention is not confined thereto. As illustrated in FIG. 21, the diffraction grating surface may take its place at a boundary between two different materials.

Next, the color flare and its cause or the diffracted light in the needless orders (or the orders other than the design order) are described below. For the convenience of explaining the diffraction efficiencies in the needless orders, the stratified multilayer type diffractive optical element of the invention is assumed to have two layers in the structure as shown in FIG. 2. Then, materials are selectively combined with grating thicknesses. For the first diffraction grating 4, the material to be used is an ultraviolet curable polymer C001 (nd=1.524, vd=50.8) made by Dai-Nihon Ink Chemical Industry Co. Ltd. Another ultraviolet curable polymer (nd=1.635, vd=23.0) is used in the second diffraction grating 5. The thickness of the first diffraction grating 4 is taken at d1=9.5 $\mu$m, the thickness of the second diffraction grating 5 is taken at d2=6.9 $\mu$m, the distance between the two diffraction gratings 4 and 5 is taken at Dl=1.0 $\mu$m, and the grating pitch is taken at 140 $\mu$m. Also, the design order is the first order.

Figure 3:
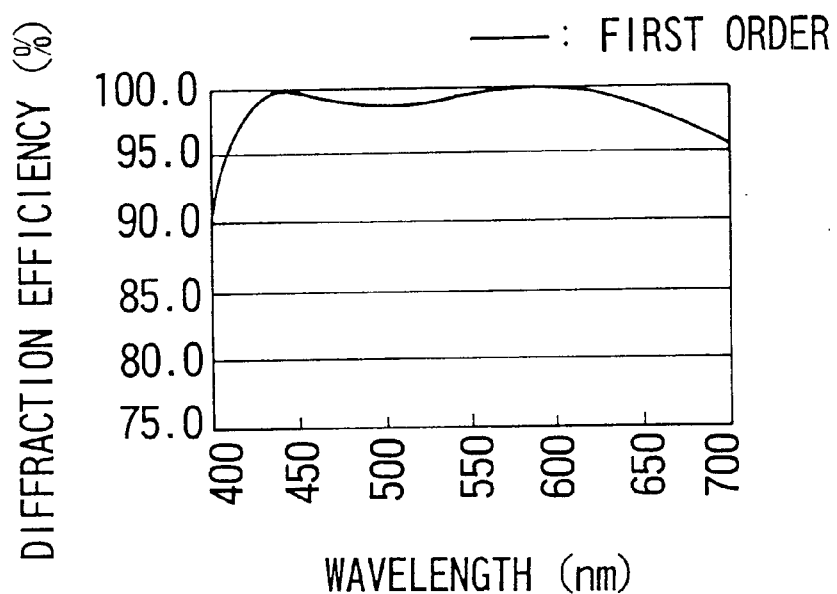
FIG. 3 is a graph for explaining the diffraction efficiency in the design order of the diffractive optical element according to the first embodiment of the invention.
Figure 4:
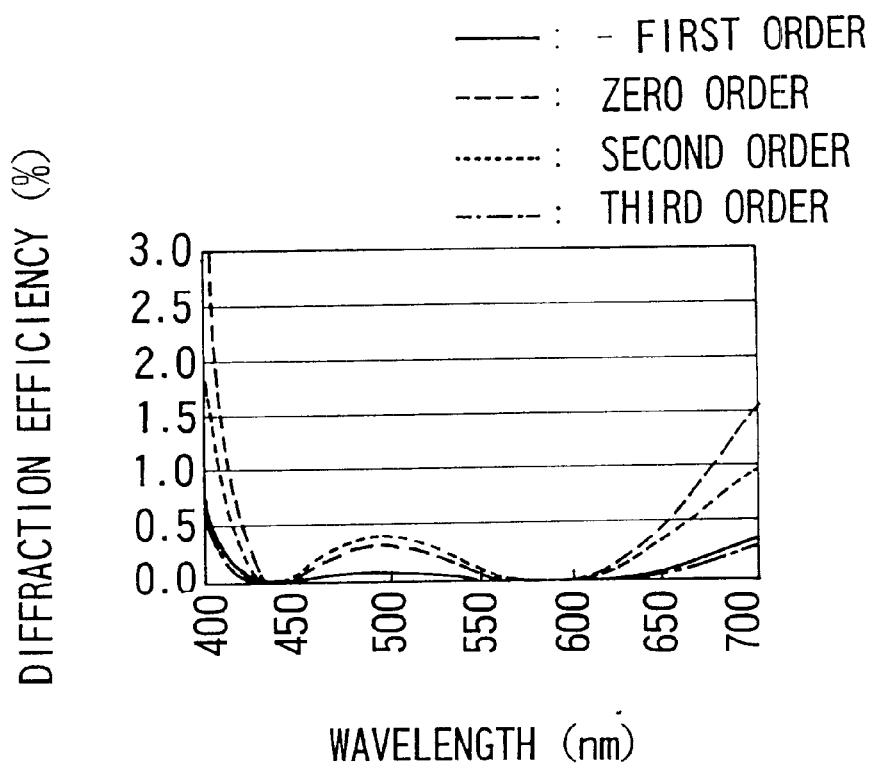
FIG. 4 is a graph for explaining the diffraction efficiencies in the needless orders of the diffractive optical element according to the first embodiment of the invention.

Here, the diffraction efficiency in the design or first order is obtained as shown in FIG. 3. In this example, the design wavelength $\lambda 0$ exits two in the visible region. In the order from the shorter wavelength side, two design wavelengths $\lambda 0$ are 438 nm and 588 nm. As is apparent from FIG. 3, the diffraction efficiency is made to be 100% at the two design wavelengths 438 nm and 588 nm. Also, in FIG. 4 are shown the diffraction efficiencies in the needless orders. It is understandable that no needless diffracted light exists at the design wavelengths 438 nm and 588 nm and that, as light diffracts in the first order with lowered efficiencies in regions between and beyond the two design wavelengths, the diffraction efficiencies in each of the orders other than the first order become high in those regions. In other words, for the orders other than the design order, needless diffracted light occurs. Further, from FIG. 4, it can be seen that, concerning the higher orders: m+2, m+3, . . . and m–2, m–3, . . . , the farther the order goes away from the design order m, the lower the diffraction efficiency becomes. Therefore, flare light becomes progressively weaker, and comes to have lesser influence. For this reason, of the needless orders, the diffraction orders next to the design order, namely, the (m−1)st order and the (m+1)st order, can be said to have a great influence on flare. Therefore, if flare caused by the diffracted rays in the (m±1)st order falls within a tolerance, flare caused by the diffracted rays in even higher ones of the needless orders will be acceptable as a matter of course.

On this account, in the invention, of the needless orders, particularly, the (m−1)st and (m+1)st orders are dealt with so that the diffracted light in these orders has not to be appreciable as color flare. For this purpose, as the diffractive optical element is constructed with a plurality of diffraction gratings, determination is made of all the design parameters (grating pitches, refractive indices and dispersions of the materials, the grating shapes in section, etc.) in such a way that the color flare becomes white or a color near to white.

Figure 5:
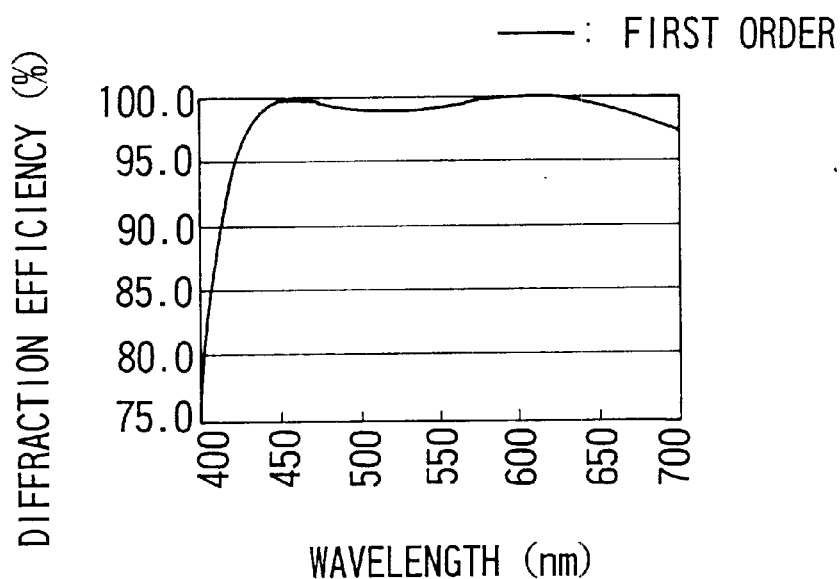
FIG. 5 is a graph for explaining the diffraction efficiency in the design order of a diffractive optical element according to an example of modification of the first embodiment of the invention.
Figure 6:
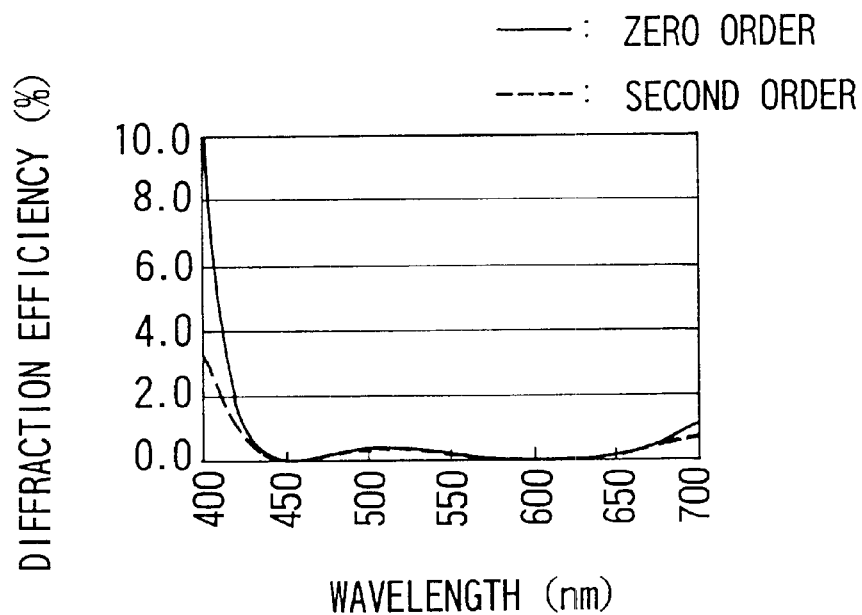
FIG. 6 is a graph for explaining the diffraction efficiencies in the needless orders of the diffractive optical element shown in FIG. 5.

Additional three examples of diffractive optical elements with variation of some of the parameters are shown in FIGS. 5 to 10. Here, the materials from which to make up the elements, the grating pitches and the design orders remain the same with the before-described or first example, but only the grating thicknesses in each pair are made to change. In the table of FIG. 11, for every example, the values of the grating thicknesses of the two diffraction gratings are listed in combination. For every one of these combinations, there are also listed the values of the two design wavelengths, the interval between the design wavelengths, and the amount of flare sensed when a color image is recorded by an image pickup means to be described later. FIGS. 5 and 6 correspond to the second example in FIG. 11, showing the diffraction efficiencies in the design order and in the orders other than the design order, respectively. Similarly, FIGS. 7 and 8 correspond to the third example in FIG. 11, showing the diffraction efficiencies in the design order and in the orders other than the design order, respectively, and FIGS. 9 and 10 correspond to the fourth example in FIG. 11, showing the diffraction efficiencies in the design order and in the orders other than the design order, respectively. As is understandable from these figures, the diffraction efficiencies in the needless orders or those other than the design order vary to large extent, depending on the design wavelengths in the design order. So, as a whole, the color appearance of flare is caused to change.

Figure 12:
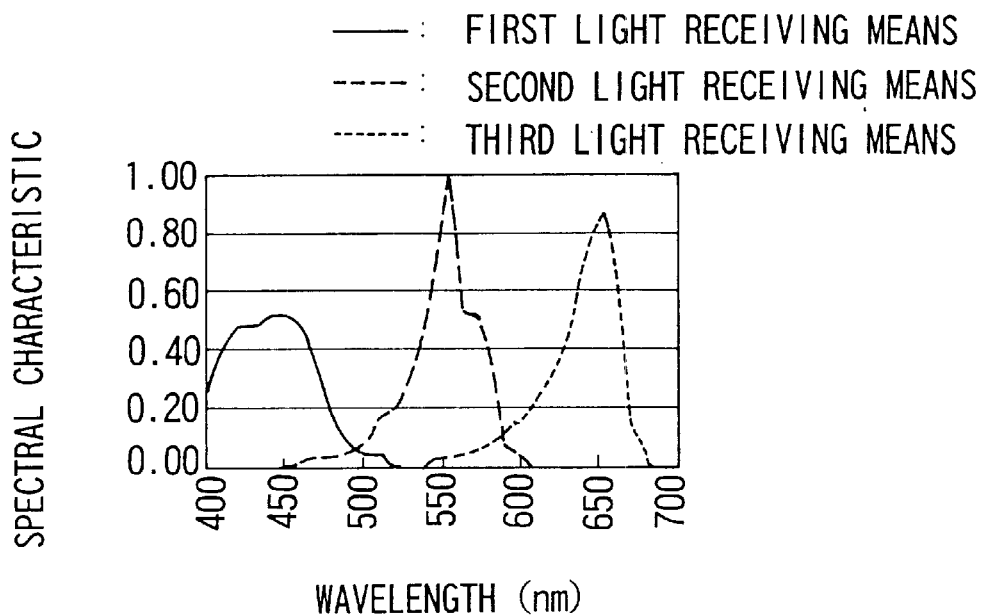
FIG. 12 is a graph for explaining the spectral characteristic of the common color film.

Before explaining the amount of flare, the spectral characteristic of the image pickup means is described below. The term "image pickup means" connotes a means for recording an image, for example, silver-halide film or a CCD. Taking an example of the common color film, the spectral sensitivity characteristic in the visible spectrum is shown in FIG. 12. The image pickup means comprises, usually, three light receiving means for respective different wavelength regions. By mixing the outputs of the three light receiving means, a color image is reproduced. The silver-halide color film is constructed with three photo-sensitive layers having peak sensitivities at blue, green and red, respectively. The CCD, too, is constructed with three sensors having peak sensitivities at blue, green and red, respectively. Hereinafter, the three light receiving means whose sensitivities reach peaks at blue, green and red are called respectively the "first", "second" and "third" light receiving means.

Figure 7:
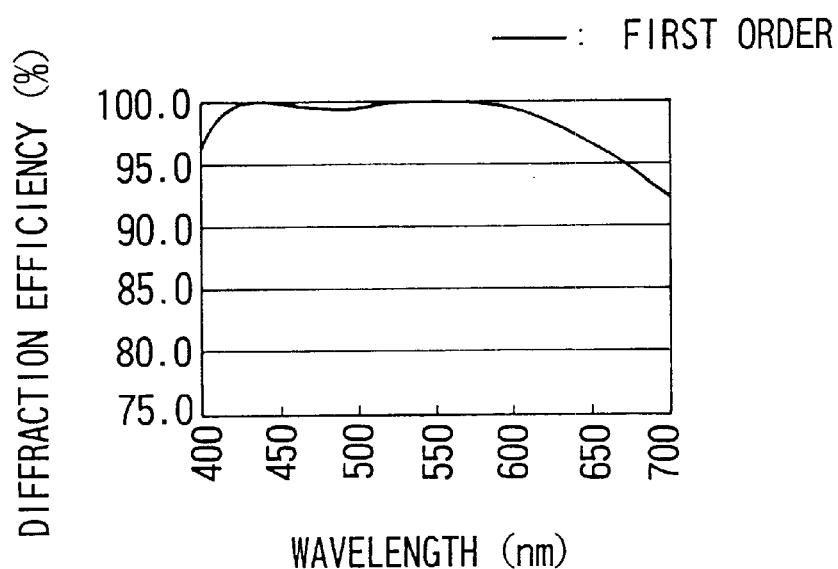
FIG. 7 is a graph for explaining the diffraction efficiency in the design order of a diffractive optical element of another example of modification of the first embodiment of the invention.
Figure 8:
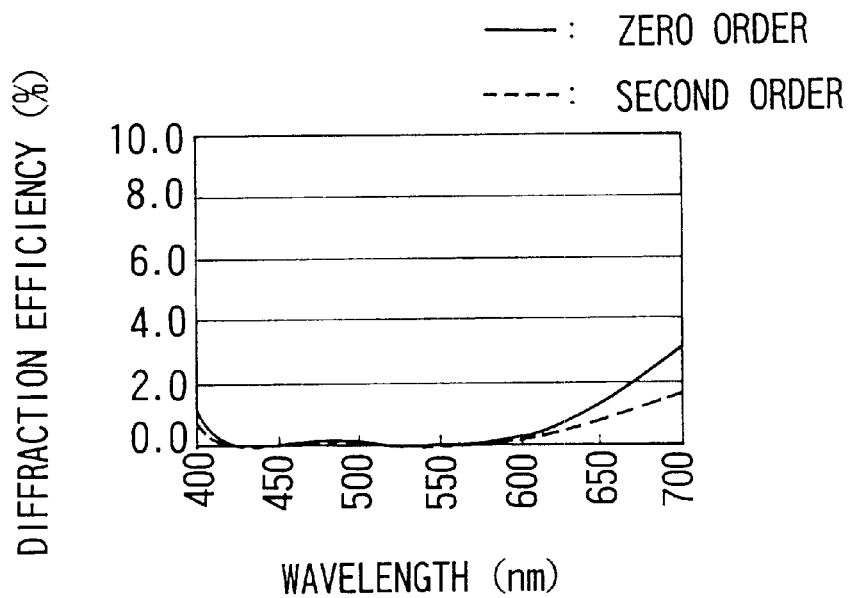
FIG. 8 is a graph for explaining the diffraction efficiencies in the needless orders of the diffractive optical element shown in FIG. 7.
Figure 9:
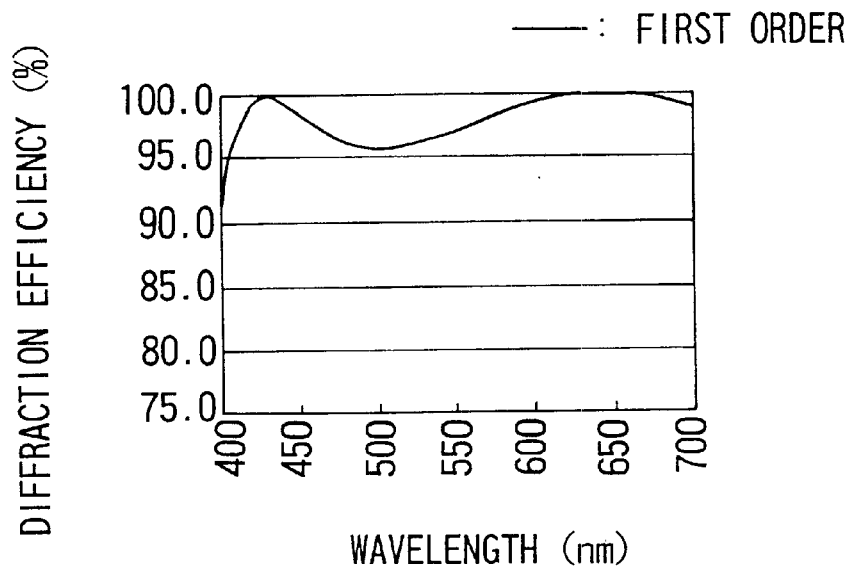
FIG. 9 is a graph for explaining the diffraction efficiency in the design order of a diffractive optical element of a further example of modification of the first embodiment of the invention.
Figure 10:
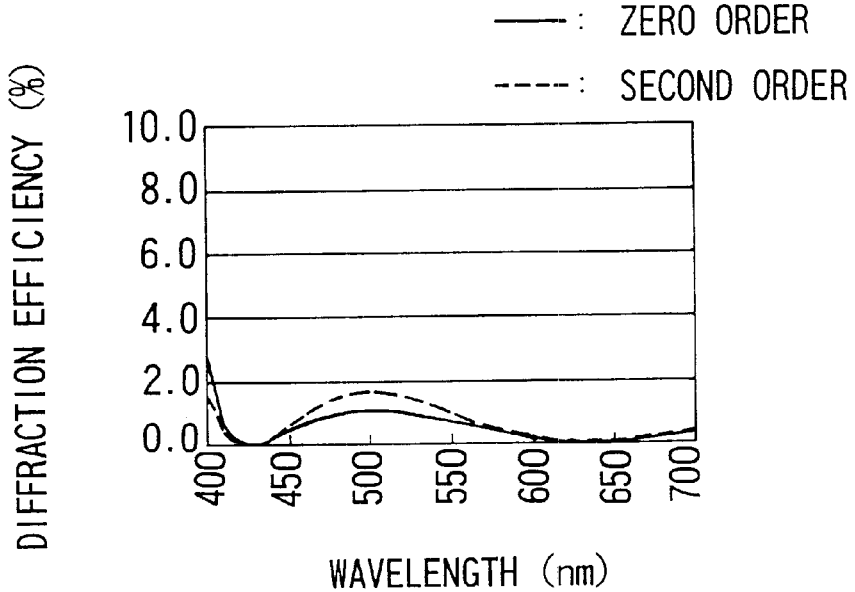
FIG. 10 is a graph for explaining the diffraction efficiencies in the needless orders of the diffractive optical element shown in FIG. 9.

On comparison of the two graphs of the spectral characteristics of the image pickup means and the diffraction efficiencies, in the case of FIGS. 5 and 6, the light in the needless orders is rich in the blue component. Therefore, the color flare is liable to be recorded on the first light receiving means. In the case of FIGS. 7 and 8, a red component of the light in the needless orders is stronger, so that the color flare is liable to be recorded on the third light receiving means. In the case of FIGS. 9 and 10, a green component of the light in the needless orders is stronger, so that the color flare is liable to be recorded on the second light receiving means.

Therefore, what causes the stratified multilayer DOE to produce color flare can be said that the diffracted light in the needless order, i.e., the (m+1)st order or the (m−1)st order (where m is the design order), is increased in intensity as received by each of the first, second and third light receiving means, and that the color balance of the diffracted rays in the needless orders, which are received by the three light receiving means, collapse.

To solve this problem, in accordance with the present invention, measure is taken so that the color flare becomes inconspicuous by optimizing the combination of a plurality of design wavelengths $\lambda 0$. For that purpose, the amount of the diffracted light in the needless orders is defined on the basis of the spectral characteristics. Then, determination of a plurality of design wavelengths is made in such a way that the components of the color flare received by the three light receiving means are taken in good intensity balance. So, a white or nearly white flare results.

The process for producing a most appropriate combination of a plurality of design wavelengths $\lambda 0$ and the functions of the thus-obtained arrangement are described below. First, explanation is given to how the spectral characteristics of the photographic optical system are changed by using the diffractive optical element. Most of the conventional photographic optical systems have their spectral characteristics determined from the light emission spectrum of the light source, the spectral sensitivities of the image pickup means and the spectral transmittance of the photographic lens. Particularly, when the image pickup means is divided into three light receiving means of respective different wavelength regions, the spectral characteristics are defined as follows:

$$L(\lambda)F1(\lambda)T(\lambda) \qquad (7\text{-}1)$$

$$L(\lambda)F2(\lambda)T(\lambda) \qquad (7\text{-}2)$$

$$L(\lambda)F3(\lambda)T(\lambda) \qquad (7\text{-}3)$$

where $L(\lambda)$ represents the light emission spectrum of the light source, being the energy of light of a wavelength $\lambda$, $F1(\lambda)$, $F2(\lambda)$ and $F3(\lambda)$ represent spectral sensitivity characteristics of the first, second and third light receiving means of the image pickup means, each being the sensitivity relative to the light of the wavelength $\lambda$, and $T(\lambda)$ represents a spectral transmittance of the photographic optical system, being the transmittance relative to the light of the wavelength $\lambda$.

Further, these equations are related as follows:

$$\int L(\lambda)F1(\lambda)T(\lambda)d\lambda = \int L(\lambda)F2(\lambda)T(\lambda)d\lambda \qquad (8)$$

$$= \int L(\lambda)F3(\lambda)T(\lambda)d\lambda$$

The outputs of the three light receiving means are all made equal to one another when the original colors are mixed. Thus, a color image is formed in good color balance.

Figure 13:
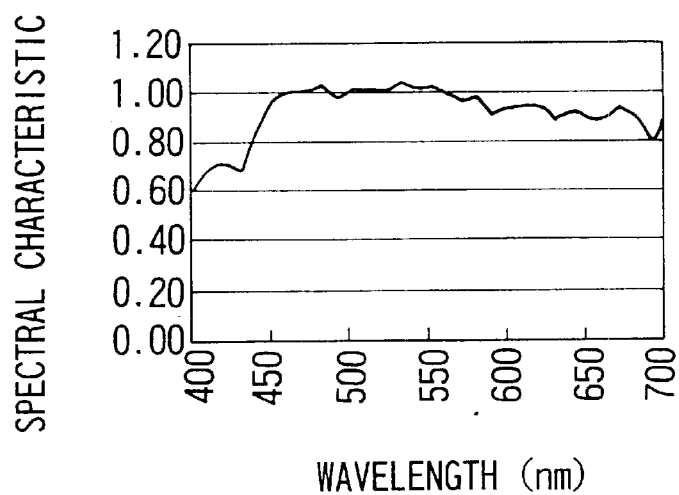
FIG. 13 is a graph for explaining the spectral characteristic of a white light source.
Figure 14:
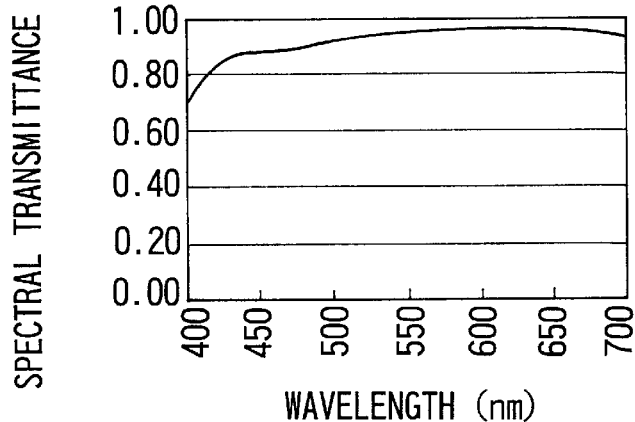
FIG. 14 is a graph for explaining the spectral transmittance of a lens.
Figure 15:
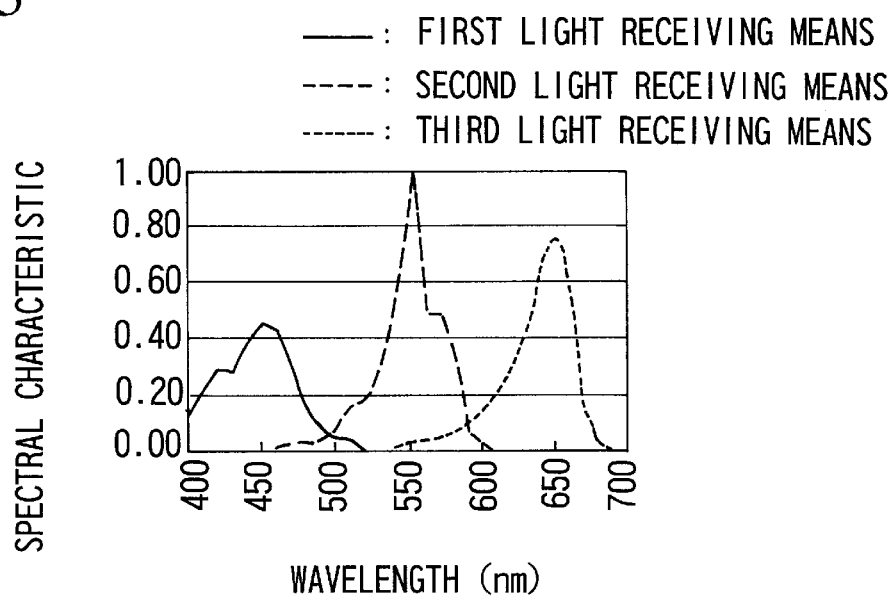
FIG. 15 is a graph for explaining the spectral characteristic of the photographic optical system except for the DOE in the first embodiment of the invention.

Here, the first embodiment of the invention operates under the conditions that the light source is a white light source (D65) having the spectral characteristic $L(\lambda)$ shown in FIG. 13, the image pickup means is a common color film having the spectral characteristics $F1(\lambda)$, $F2(\lambda)$ and $F3(\lambda)$ shown in FIG. 12 and the lens has the transmittance $T(\lambda)$ shown in FIG. 14. These conditions are factored into computation for the spectral characteristics of the photographic optical system. The spectral characteristics obtained as a result of the computation are shown in FIG. 15.

Then, a diffractive optical element is used in such a photographic optical system. Thereupon, another factor is added, representing the diffraction efficiency $D_m(\lambda)$ in the design order m of the diffractive optical element. The diffraction efficiency $D_m(\lambda)$ varies as a function of the design wavelengths $\lambda 0$ and any other wavelengths $\lambda$, so that it can be described as $D_m(\lambda 0, \lambda)$. Therefore, when the diffractive optical element of the design wavelengths $\lambda 0$ is used, the spectral characteristics can be defined as follows:

$$D_m(\lambda 0, \lambda) L(\lambda) F1(\lambda) T(\lambda) \tag{9-1}$$

$$D_m(\lambda 0, \lambda) L(\lambda) F2(\lambda) T(\lambda) \tag{9-2}$$

$$D_m(\lambda 0, \lambda) L(\lambda) F3(\lambda) T(\lambda) \tag{9-3}$$

Of course, for the optical system, since the diffractive optical element is incorporated therein, because the outputs of the three light receiving means are equalized to reproduce colors in good balance, equations similar to the equations (8) are established.

$$\int D_m(\lambda 0, \lambda) L(\lambda) F1(\lambda) T(\lambda) d\lambda = \int D_m(\lambda 0, \lambda) L(\lambda) F2(\lambda) T(\lambda) d\lambda \tag{10}$$
$$= \int D_m(\lambda 0, \lambda) L(\lambda) F3(\lambda) T(\lambda) d\lambda$$

Using the above formulas, the spectral characteristics of the diffracted light in the needless orders can be defined. Letting the design order be denoted by m, the spectral characteristics of the diffracted light in the (m−1)st order can be defined as follows:

$$D_{m-1}(\lambda 0, \lambda) L(\lambda) F1(\lambda) T(\lambda) \tag{11-1}$$

$$D_{m-1}(\lambda 0, \lambda) L(\lambda) F2(\lambda) T(\lambda) \tag{11-2}$$

$$D_{m-1}(\lambda 0, \lambda) L(\lambda) F3(\lambda) T(\lambda) \tag{11-3}$$

Similarly, the spectral characteristics of the diffracted light in the (m+1)st order can be defined as follows:

$$D_{m+1}(\lambda 0, \lambda) L(\lambda) F1(\lambda) T(\lambda) \tag{12-1}$$

$$D_{m+1}(\lambda 0, \lambda) L(\lambda) F2(\lambda) T(\lambda) \tag{12-2}$$

$$D_{m+1}(\lambda 0, \lambda) L(\lambda) F3(\lambda) T(\lambda) \tag{12-3}$$

The thus-defined spectral characteristics are used for defining the amount of flare. Since the spectral characteristics exhibit values of the energy of light of a wavelength $\lambda$ which, after having passed through the optical system, are recorded, in order to find the total energy of light contributing to image formation, all what to do is to integrate each of the spectral characteristics over all values of wavelengths $\lambda$.

Therefore, each of the amounts of flare (total energy) caused by the diffracted light in the needless orders can be defined by integration of the formulas (11-1) to (11-3) and the formulas (12-1) to (12-3). In such a manner, the amounts of flare in the (m−1)st order and the (m+1)st order are defined. Taking the sum of the amounts of flare and normalizing the results by the integrated values of the spectral characteristics of the diffracted light in the design order, or the total energy, (9-1) to (9-3), the amounts of color flare $E1(\lambda 0)$, $E2(\lambda 0)$ and $E3(\lambda 0)$ for the first, second and third light receiving means are respectively expressed by the following formulas:

The amount of color flare received by the first light receiving means, $E1(\lambda 0)$:

$$\frac{\int D_{m-1}(\lambda 0, \lambda) L(\lambda) F1(\lambda) T(\lambda) d\lambda +}{\int D_m(\lambda 0, \lambda) L(\lambda) F1(\lambda) T(\lambda) d\lambda} \tag{13-1}$$

The amount of color flare received by the second light receiving means, $E2(\lambda 0)$:

$$\frac{\int D_{m-1}(\lambda 0, \lambda) L(\lambda) F2(\lambda) T(\lambda) d\lambda +}{\int D_m(\lambda 0, \lambda) L(\lambda) F2(\lambda) T(\lambda) d\lambda} \tag{13-2}$$

The amount of color flare received by the third light receiving means, $E3(\lambda 0)$:

$$\frac{\int D_{m-1}(\lambda 0, \lambda) L(\lambda) F3(\lambda) T(\lambda) d\lambda +}{\int D_m(\lambda 0, \lambda) L(\lambda) F3(\lambda) T(\lambda) d\lambda} \tag{13-3}$$

In the case of using the stratified multilayer DOE, the amount of flare must be concerned about the magnitude of each of the amounts of color flare received by the respective light receiving means and the balance between any two of the amounts of color flare received by the respective light receiving means. It is, therefore, required that all the values of the formulas (13-1), (13-2) and (13-3) become smaller, and that at least one of the three light receiving means does not pick up an extremely large amount of light relative to the others. Hence, for the stratified multilayer DOE, the design wavelengths $\lambda 0$ have to be determined so as to fulfill the above requirements.

Therefore, if color flare would otherwise be produced, the color flare is made to become white or a color near to white, thus making the color flare inconspicuous. For that purpose, letting the formulas (13-1), (13-2) and (13-3) be denoted by $E1(\lambda 0)$, $E2(\lambda 0)$ and $E3(\lambda 0)$, respectively, all there is to do is to determine the design wavelengths $\lambda 0$ of the stratified multilayer DOE so as to satisfy the following conditions (1) and (2):

$$0 < E1(\lambda 0) + E2(\lambda 0) + E3(\lambda 0) < 0.04 \tag{1}$$

$$0 < \max\{E1(\lambda 0), E2(\lambda 0), E3(\lambda 0)\} - \min\{E1(\lambda 0), E2(\lambda 0), E3(\lambda 0)\} < 0.02 \tag{2}$$

where $\max\{E1(\lambda 0), E2(\lambda 0), E3(\lambda 0)\}$ represents a maximum value among $E1(\lambda 0)$, $E2(\lambda 0)$ and $E3(\lambda 0)$, and $\min\{E1(\lambda 0), E2(\lambda 0), E3(\lambda 0)\}$ represents a minimum value among $E1(\lambda 0)$, $E2(\lambda 0)$ and $E3(\lambda 0)$.

The factor in the inequalities (1) represents the sum of the amounts of flare of blue, green and red colors at the design wavelengths $\lambda 0$. Therefore, when the upper limit of 0.04 is exceeded, the flare itself becomes conspicuous, thereby lowering the image quality. The factor in the inequalities (2) represents the difference between the maximum and minimum values of each of the amounts of flare at the design wavelengths $\lambda 0$. When the upper limit of 0.02 is exceeded, the flare appears in a color tint. Therefore, however little it may be, the flare lowers the image quality.

It will be appreciated from the foregoing that the combination of a plurality of design wavelengths $\lambda 0$ is optimized to reduce the amount of flare and to make the flare white or nearly white. It is thus made possible to obtain a photographic optical system which does not suffer color flare.

In actual practice, as applied to the silver-halide film camera, electronic camera or video camera, the optimum values of the design wavelengths will be described.

For the stratified multilayer DOE, it is preferred that, of the plurality of design wavelengths, the shortest design wavelength $\lambda 01$ satisfy one of the following conditions (14) and (14a):

$$\lambda 01 \leq 455 \text{ nm} \tag{14}$$

preferably, $$400 \text{ nm} \leq \lambda 01 \leq 455 \text{ nm} \tag{14a}$$

Referring to FIG. 11, the second example employs "$\lambda 01=455$ nm" as one of the combined design wavelengths. In this case, the diffraction efficiencies in all the orders are shown in FIGS. 5 and 6. On comparison of these figures, it can be seen that the diffraction efficiencies in the needless orders are increased in the shorter wavelength region.

Also, in the second example shown in FIG. 11, the amount of flare for the first light receiving means is 1.94%, being far larger than those for the other light receiving means. The above condition (14) or (14a) Is to determine the shortest acceptable one of the plurality of design wavelengths $\lambda 0$ that maximize the diffraction efficiency in the design order of the diffractive optical element. When the upper limit is exceeded, as this means that a longer wavelength than 455 nm is selected as the shortest design wavelength, color flare of blue becomes conspicuous.

For the stratified multilayer DOE, it is further preferred that, of the plurality of design wavelengths, the longest design wavelength $\lambda 0L$ satisfy one of the following conditions (15) and (15a):

$$550 \text{ nm} \leq \lambda 0L \tag{15}$$

preferably, $$550 \text{ nm} \leq \lambda 0L \leq 620 \text{ nm} \tag{15a}$$

Referring to FIG. 11, the third example employs "$\lambda 0L=550$ nm" as one of the combined design wavelengths. In this case, the diffraction efficiencies are shown in FIGS. 7 and 8, where it can be seen that the diffraction efficiencies in the needless orders are increased in the longer wavelength region.

Also, in the third example shown in FIG. 11, the amount of flare for the third light receiving means is 1.94%, being far larger than those for the other light receiving means. The above condition (15) or (15a) is to determine the longest acceptable one of the plurality of design wavelengths $\lambda 0$ that maximize the diffraction efficiency in the design order of the diffractive optical element. When the lower limit of 550 nm is exceeded, color flare of red becomes conspicuous.

For the stratified multilayer DOE, it is further preferred that the interval $\Delta\lambda 0.a$ between adjacent two of the plurality of design wavelengths satisfies the following condition:

$$\Delta\lambda 0.a \leq 220 \text{ nm} \tag{16}$$

where $\Delta\lambda 0.a = \lambda 0.a+1 - \lambda 0.a$ $$1 \leq a \leq L-1$$

where L is the number of the plurality of design wavelengths.

Referring to FIG. 11, the fourth example employs "$\Delta\lambda 0.a=220$ nm" between the combined design wavelengths. In this case, the diffraction efficiencies are shown in FIGS. 9 and 10, where it can be seen that the diffraction efficiencies in the needless orders are increased in the region between the two design wavelengths.

Also, in the fourth example shown in FIG. 11, the amount of flare for the second light receiving means is 1.97%, being far larger than those for the other light receiving means. The above condition (16) is to determine the intervals between any adjacent two of the plurality of design wavelengths $\lambda 0$ that maximize the diffraction efficiency in the design order of the diffractive optical element. When the upper limit of 220 nm is exceeded, color flare of green becomes conspicuous.

The construction and arrangement described above has been assumed that the design wavelength exists two in number. However, the invention is established even in a case where there are three or more design wavelengths.

Figure 16:
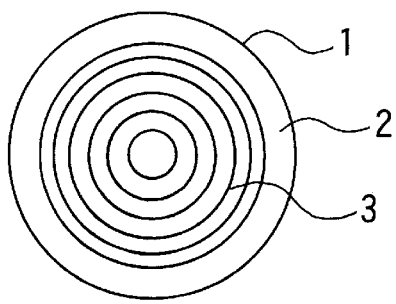
FIG. 16 is a front view of a diffractive optical lens in the invention.

The foregoing description has been directed to the stratified multilayer D0E of a type in which the grating pitch shown in FIG. 1 is constant. However, actually, the invention is not confined thereto, being applicable to another type of diffractive optical elements in which the grating pitch gradually varies as shown in FIG. 16 to produce an effect like a spherical or an aspherical lens.

Also, although the first embodiment has been described in connection with the diffractive optical element having its diffraction gratings formed on a parallel flat plate, it is to be understood that the invention is applicable to the diffraction gratings formed on a spherical surface of a lens. Even in this case, similar improved results can be attained.

Although the first embodiment has been illustrated on the assumption that the design order is the first order, the invention is not confined to the limitation of the design order to the first order. Even for the second or other higher orders than the first order, if the combined optical path length difference is determined to be equal to the desired design wavelength in the desired order, and the amount of flare caused by the diffracted light in the orders other than the design order satisfy the conditions of the invention, similar improved results can be attained, except that, in the case of using other than the first order as the design order, the dependency of the diffraction efficiency on the wavelength is intensified. In order to produce an optical system which has reduced the amount of flare and made the flare inconspicuous, it is preferred to choose the first order as the design order.

Figure 17:
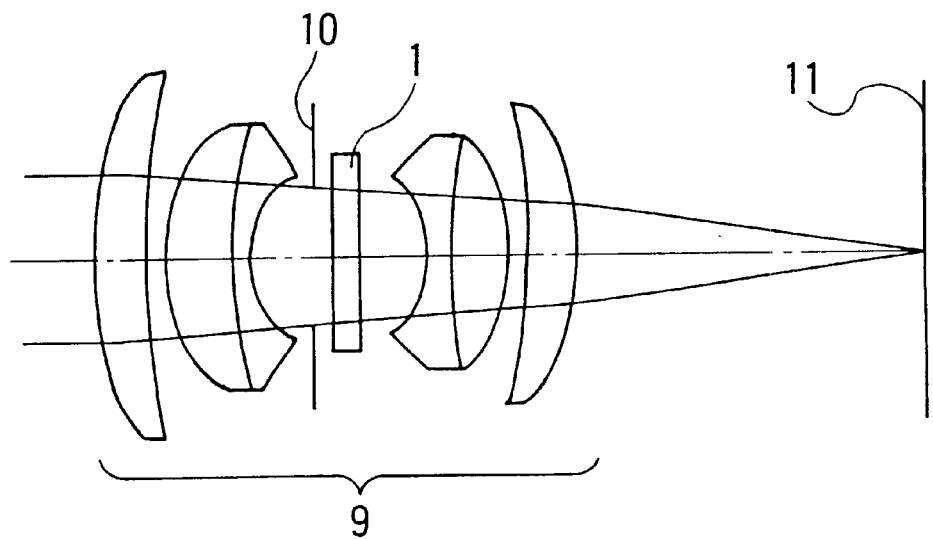
FIG. 17 is a schematic diagram of a photographic optical system according to a second embodiment of the invention.

A second embodiment of the invention is shown in FIG. 17, where the first embodiment is applied to an optical apparatus such as a camera. Referring to FIG. 17, a photographic lens 9 has a plurality of lens members, an aperture stop 10 and the diffractive optical element 1 of the invention. Film or a CCD is positioned on an image plane 11. Incidentally, the diffractive optical element 1 is positive in refractive power and corrects the chromatic aberrations of the lens.

By using the stratified multilayer structure and optimizing the combination of design wavelengths, the dependency of the diffraction efficiency on the wavelength is largely improved. Therefore, it is possible to provide a photographic lens of lesser flare and high resolving power in the low frequencies for high performance. Also, the flare is made white or nearly white according to the invention, becoming inconspicuous.

Although, in FIG. 17, the diffractive optical element of the invention has been put on the glass surface of the parallel flat plate near the stop, the invention is not confined thereto. It may be provided on any one of the spherical surfaces of the lens members. Two or more diffractive optical elements of the invention may be used in the photographic lens.

Also, although the second embodiment has been described in connection with the photographic lens of the film camera or video camera, the invention is not confined thereto. It may be applied to the office machines such as an image scanner, or a reader lens of a digital copying machine or like image forming optical systems for use in the visible or wide wavelength range.

Figure 18:
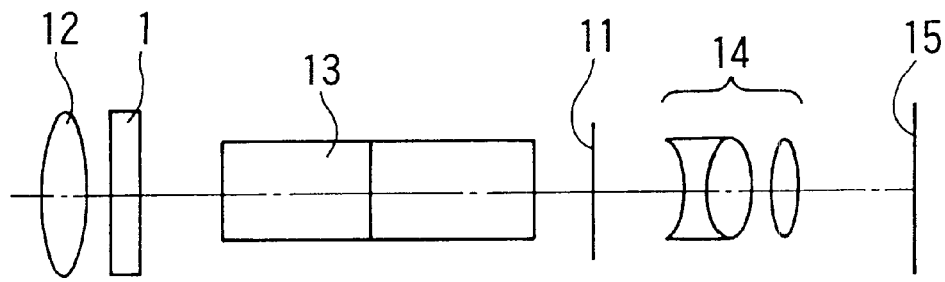
FIG. 18 is a schematic diagram of an observation optical system according to a third embodiment of the invention.

FIG. 18 is a schematic diagram showing a third embodiment of the invention as applied to an observation optical system such as a binocular using the diffractive optical element of the invention. Referring to FIG. 18, an objective lens 12 forms an object image on an image plane 11. The erected image by a prism 13 is observed through an eyepiece 14 by a pupil at an evaluation plane 15. The diffractive optical element 1 of the invention is formed with an aim to correct chromatic aberrations at the image plane 11 by the objective lens 2.

Since the dependency of the diffraction efficiency on the wavelength is greatly improved by using the stratified multilayer structure, it is possible to provide an objective lens of lesser flare and high resolving power in the low frequencies for high performance. Also, the flare is made white or nearly white according to the invention, becoming inconspicuous.

Although the third embodiment has been described as the diffractive optical element formed in the objective lens section, the invention is not confined thereto. Even if the diffractive optical element formed on the surface of the prism, or in the eyepiece, similar results are attained. However, when the position of the diffractive optical element is on the object side of the image plane 11, the chromatic aberrations of only the objective lens can be reduced. Therefore, in the case of the observation optical systems by the naked eye, it is preferred that the diffractive optical element is positioned at least adjacent to the objective lens.

Also, in the third embodiment, the case of the binocular is illustrated. However, the invention is not confined thereto. The invention may be applied to any other types of observation optical apparatuses such as a terrestrial telescope and an astronomical telescope. Also, the invention is applicable to optical type viewfinders for the lens-shutter cameras or video cameras. Even in this case, similar results can be attained.

According to the invention, it has been made possible to achieve a diffractive optical element which makes inconspicuous the color flare by changing its color to white or nearly white, and a photographic optical system having the diffractive optical element.

In particular, according to the invention, even when the diffractive optical element is applied not only to the photographic optical systems for use in normal light situations, but also to the special photographic optical systems for use in special lighting situations, it is possible to provide a photographic optical system which produces no conspicuous color flare and, therefore, can form images of good quality.

What is claimed is:

1. A photographic optical system comprising a diffractive optical element having a grating structure in which a plurality of diffraction gratings made from at least two kinds of materials different in dispersion from each other are laminated, and a maximum optical path length difference in the grating structure being m times the design wavelength for each of the design wavelengths, where m is a design order of diffraction, said diffractive optical element satisfies the following conditions for the design wavelengths $\lambda 0$:

$$0 < E1(\lambda 0) + E2(\lambda 0) + E3(\lambda 0) < 0.04$$

$$0 < \max\{E1(\lambda 0), E2(\lambda 0), E3(\lambda 0)\} - \min\{E1(\lambda 0), E2(\lambda 0), E3(\lambda 0)\} < 0.02$$

where $\max\{E1(\lambda 0), E2(\lambda 0), E3(\lambda 0)\}$ represents a maximum value among $E1(\lambda 0), E2(\lambda 0)$ and $E3(\lambda 0)$, and $\min\{E1(\lambda 0), E2(\lambda 0), E3(\lambda 0)\}$ represents a minimum value among $E1(\lambda 0), E2(\lambda 0)$ and $E3(\lambda 0)$, where $$E1(\lambda 0) = \frac{\int D_{m-1}(\lambda 0, \lambda) L(\lambda) F1(\lambda) T(\lambda) d\lambda + \int D_{m+1}(\lambda 0, \lambda) L(\lambda) F1(\lambda) T(\lambda) d\lambda}{\int D_m(\lambda 0, \lambda) L(\lambda) F1(\lambda) T(\lambda) d\lambda}$$

$$E2(\lambda 0) = \frac{\int D_{m-1}(\lambda 0, \lambda) L(\lambda) F2(\lambda) T(\lambda) d\lambda + \int D_{m+1}(\lambda 0, \lambda) L(\lambda) F2(\lambda) T(\lambda) d\lambda}{\int D_m(\lambda 0, \lambda) L(\lambda) F2(\lambda) T(\lambda) d\lambda}$$

$$E3(\lambda 0) = \frac{\int D_{m-1}(\lambda 0, \lambda) L(\lambda) F3(\lambda) T(\lambda) d\lambda + \int D_{m+1}(\lambda 0, \lambda) L(\lambda) F3(\lambda) T(\lambda) d\lambda}{\int D_m(\lambda 0, \lambda) L(\lambda) F3(\lambda) T(\lambda) d\lambda}$$

where $$\int D_m(\lambda 0, \lambda) L(\lambda) F1(\lambda) T(\lambda) d\lambda = \int D_m(\lambda 0, \lambda) L(\lambda) F2(\lambda) T(\lambda) d\lambda$$
$$= \int D_m(\lambda 0, \lambda) L(\lambda) F3(\lambda) T(\lambda) d\lambda$$

where $D_{m-1}(\lambda 0, \lambda)$, $D_m(\lambda 0, \lambda)$ and $D_{m+1}(\lambda 0, \lambda)$ represent diffraction efficiencies for a wavelength $\lambda$ in the (m−1)st, m-th and (m+1)st orders, respectively, in said diffractive optical element, and $L(\lambda)$ represents a spectral characteristic for the wavelength $\lambda$ of a light source, $F1(\lambda)$, $F2(\lambda)$ and $F3(\lambda)$ represent spectral sensitivity characteristics of blue, green and red light receiving means in an image pickup means, and $T(\lambda)$ represents a transmittance for the wavelength $\lambda$ of said photographic optical system.

2. A photographic optical system according to claim 1, wherein the shortest design wavelength $\lambda 01$ among the design wavelengths of said diffractive optical element satisfies the following condition:

$$400 \text{ nm} \leq \lambda 01 \leq 455 \text{ nm}.$$

3. A photographic optical system according to claim 1, wherein the longest design wavelength $\lambda 0L$ among the design wavelengths of said diffractive optical element satisfies the following condition:

$$550 \text{ nm} \leq \lambda 0L \leq 620 \text{ nm}.$$

4. A photographic optical system according to claim 1, wherein an interval $\Delta\lambda 0.a$ between adjacent two of the design wavelengths of said diffractive optical element satisfies the following condition:

$$\Delta\lambda 0.a \leq 220 \text{ nm}$$

where $\Delta\lambda 0.a = \lambda 0.a+1 - \lambda 0.a$ $$1 \leq a \leq L-1$$

where L is the number of the design wavelengths.

5. A photographic optical system according to claim 1, wherein at least one of the plurality of diffraction gratings differs in orientation of grating from the other diffraction gratings.

6. A photographic optical system according to claim 1, wherein the diffraction gratings are layered on a substrate and, when the diffraction gratings are consecutively numbered, from the diffraction grating nearest to the substrate, as the first diffraction grating, the second diffraction grating and up to the i-th diffraction grating, a material from which the first diffraction grating is made is the same as a material of the substrate.

7. A photographic optical system according to claim 1, wherein the plurality of diffraction gratings are arranged in intimate contact or in closely spaced relation.

8. A photographic optical system according to claim 1, wherein said optical elements satisfies the following condition for each of the design wavelengths:

$$m=1.$$

9. A camera comprising:
   a photographic optical system according to claim 1; and
   a CCD as the image pick-up means.

10. A camera comprising:
    a photographic optical system according to claim 1; and
    color film as the image pick-up means.

* * * * *

UNITED STATES PATENT AND TRADEMARK OFFICE
CERTIFICATE OF CORRECTION

PATENT NO.    : 6,507,437 B1
DATED         : January 14, 2003
INVENTOR(S)   : Takehiko Nakai It is certified that error appears in the above-identified patent and that said Letters Patent is hereby corrected as shown below:

<u>Title page,</u>
Item [57], ABSTRACT,
Line 7, "times," should read -- time, --.

<u>Column 1,</u>
Line 20, "o:" should read -- of --; and
Line 28, "Hei 4-21342and" should read -- Hei 4-213421 and --.

<u>Column 4,</u>
Line 60, "$\lambda L$" should read -- $\lambda 0L$ --.

<u>Column 5,</u>
Line 64, "DRAWING" should read -- DRAWINGS --.

<u>Column 8,</u>
Line 16, "(6)" should read -- ......(6) --.

<u>Column 12,</u>
Line 54, "<0.0(2)" should read -- <0.02 ...(2) --.

<u>Column 13,</u>
Line 30, "Is" should read -- is --.

Signed and Sealed this

Tenth Day of February, 2004

JON W. DUDAS
*Acting Director of the United States Patent and Trademark Office*